US00RE40619E

(19) United States
(12) Reissued Patent
Knoble et al.

(10) Patent Number: US RE40,619 E
(45) Date of Reissued Patent: Jan. 6, 2009

(54) EFFICIENT FLUORESCENT LIGHTING SYSTEM

(75) Inventors: David W. Knoble, Tupelo, MS (US); Eugene Graff, Tupelo, MS (US)

(73) Assignee: Genlyte Thomas Group LLC, Louisville, KY (US)

(21) Appl. No.: 11/225,841

(22) Filed: Sep. 13, 2005

Related U.S. Patent Documents

Reissue of:
(64) Patent No.: 6,817,732
Issued: Nov. 16, 2004
Appl. No.: 10/310,665
Filed: Dec. 5, 2002

(51) Int. Cl.
*F21S 4/00* (2006.01)

(52) U.S. Cl. ..... 362/225; 362/147; 362/227; 362/217; 362/411; 362/260; 362/221

(58) Field of Classification Search ..... 362/225, 362/147, 148, 227, 217, 295, 394, 411, 364–366, 362/260, 221; 315/209 R, 291, DIG. 4
See application file for complete search history.

(56) References Cited

U.S. PATENT DOCUMENTS

| | | | |
|---|---|---|---|
| 1,902,026 | A | 3/1933 | Hall |
| 2,434,781 | A | 1/1948 | Kurtzon |
| 2,455,333 | A | 11/1948 | Harris |
| 2,539,974 | A | 1/1951 | Riddell |
| 2,687,516 | A | 8/1954 | Schneiderman |
| 2,958,763 | A | 11/1960 | Bodian |
| 3,049,579 | A | 8/1962 | Sulzer |
| 3,155,324 | A | 11/1964 | Chen |
| 3,349,237 | A | 10/1967 | Jackson |
| 3,555,267 | A | 1/1971 | Sutter |
| 3,816,880 | A | 6/1974 | Jacobs |
| 3,909,100 | A | 9/1975 | Hodge, Jr. |
| 4,000,406 | A | 12/1976 | Bhavsar |
| 4,054,790 | A | 10/1977 | Slaughter |
| 4,298,918 | A | 11/1981 | Metcalf, II |
| 4,323,953 | A | 4/1982 | Hutchison |
| 4,407,011 | A | 9/1983 | Lahm |
| 4,422,132 | A | 12/1983 | Trowbridge |
| 4,494,175 | A | 1/1985 | Gawad et al. |
| 4,498,126 | A | 2/1985 | Hernandez |
| 4,646,212 | A | 2/1987 | Florence |
| 5,008,790 | A | 4/1991 | Fabbri |
| 5,183,327 | A | 2/1993 | Fabbri |
| 5,371,444 | A | 12/1994 | Griffin |
| 5,658,067 | A | 8/1997 | Engle et al. |
| 5,800,050 | A | 9/1998 | Leadford |
| 6,164,797 | A | 12/2000 | Crane et al. |
| 6,346,782 | B1 | 2/2002 | Knoble |
| 6,422,721 | B1 | 7/2002 | Plunk et al. |
| 6,805,470 | B1 | 10/2004 | Ward |
| 6,817,732 | B1 | 11/2004 | Knoble et al. |
| 6,854,860 | B2 | 2/2005 | Plunk |
| 2005/0201094 | A1 | 9/2005 | Plunk |

*Primary Examiner*—Sharon Payne
(74) *Attorney, Agent, or Firm*—John F. Salazar; Middleton Reutlinger

(57) ABSTRACT

An improved efficiency fluorescent lighting system is described. The system utilizes reduced rows of fluorescent luminaires which are spaced much further apart than traditional spacing. The luminaires used in the system of the present invention have increased light output of each luminaire by up to fifty percent through a combination of use of a high efficiency lamp producing about 3250 lumens, an electronic dimming ballast having a ballast factor of about 1.2 and a luminaire having a spacing to mounting height ratio of at least 1.5.

15 Claims, 1 Drawing Sheet

EFFICIENT FLUORESCENT LIGHTING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an improved efficiency fluorescent lighting system. More specifically the present invention is directed towards a fluorescent light fixture and system wherein the light fixture may be utilized within a fluorescent lighting system, the system requiring fewer lamps due to the higher efficacy of the lamps and ballast. The system utilizes a high efficiency lamp in combination with a dimming ballast having a high ballast factor in combination with a relatively high spacing to mounting height ratio.

DETAILED DESCRIPTION OF THE PREFERRED EMBODIMENTS

Figure 1:
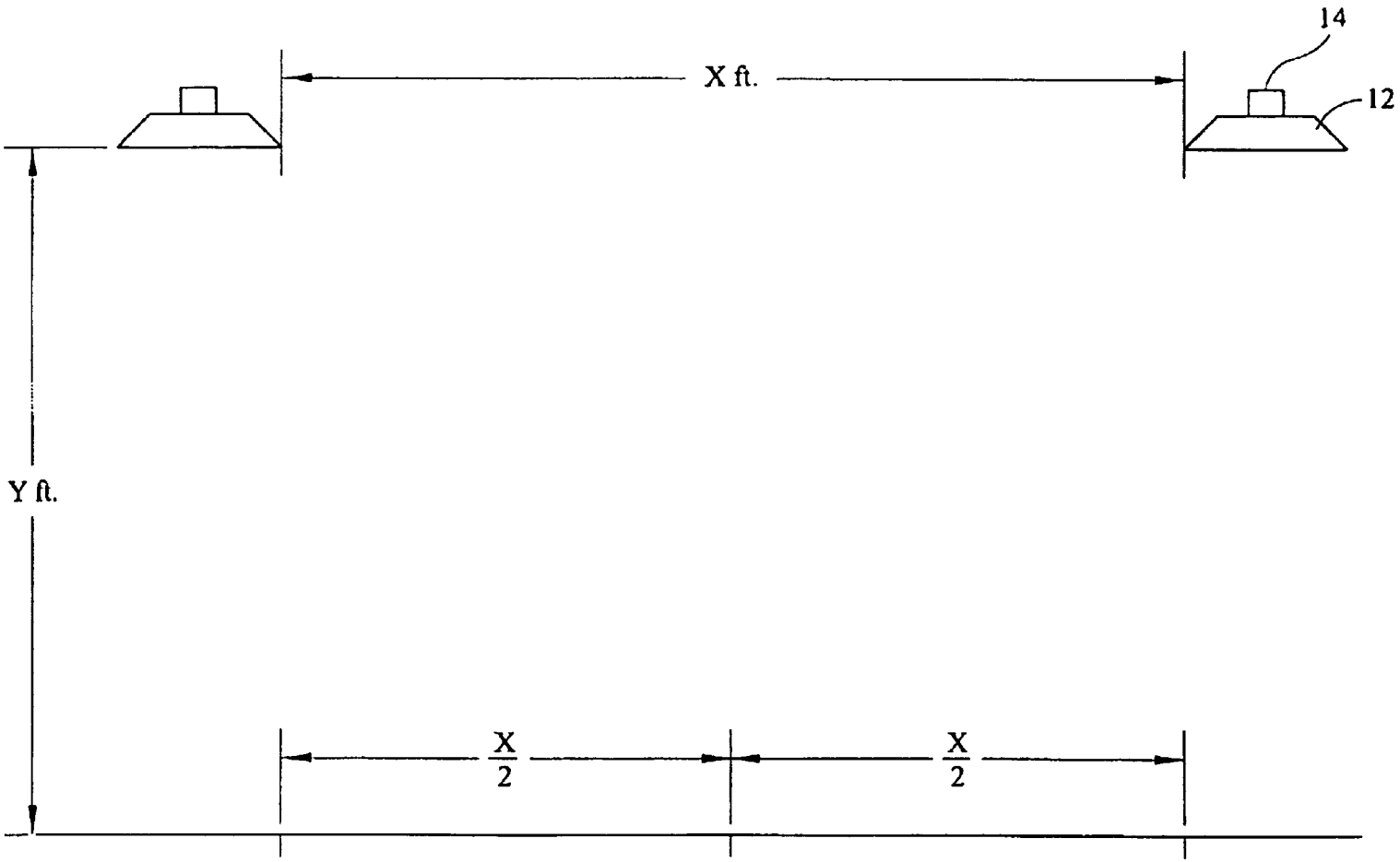
FIG. 1 is a diagrammatic representation of a lighting system employing features of the embodiments of the present invention.

Fluorescent lighting systems within retail environments typically require fairly narrow spacing of the light fixture in order to assure proper illumination on the floor midway between overhead luminaires. By increasing the number of fixtures within the area to be illuminated, energy usage obviously increases dramatically. It is therefore desirable to widely space the luminaires within the fluorescent lighting system while also assuring proper illumination within the illuminated area. Most fluorescent lighting systems in retail sales produce approximately 1,000 to 1,200 lumens per foot based on an industry standard of a 0.88 ballast factor for an electronic ballast exhibiting typically 2,750 initial lumens for a T8 four foot lamp. For reasonable illumination, it is usual to place the luminaires approximately 12 to 15 feet above the floor space in continuous rows which are spaced 12 feet apart. Such placement of luminaires yields uniform illumination at appropriate levels. Separation of the luminaires to predefined distances larger than 12 feet causes noticeably reduced illumination on the floor space.

Improved efficiency lighting systems such as disclosed herein allow reduction in the total number of luminaires placed within the lighting system while also maintaining adequate illumination. Such increase in efficiency of the lighting system may allow for increasing the spacing of the individual luminaires within the fluorescent lighting system with corresponding reduction in power usage over the entire system since fewer luminaires are required. Each individual fixture may use more power to produce a higher lumen output, but the overall lighting requirements may be met by fewer fixtures. This may also be coupled with in store placement of a fluorescent lighting system which is designed to be utilized in combination with day lighting within the store structure and dimming ballast to reduce power usage. Thus, energy usage during the day light hours may be significantly reduced when used in combination with a high efficiency fluorescent lighting system as described herein.

The improved efficiency fluorescent lighting system of the present invention combines a high efficiency fluorescent lamp, a dimming ballast having a high ballast factor of approximately 1.2 and a luminaire which allows a relatively high spacing to mounting height ratio of about 1.5. Such an improved efficiency fluorescent lighting system may result in a power reduction of about 18% or more due to the high lumen output of the individual luminaires in combination with the reduced number of fixtures required within the system.

The improved efficiency fluorescent lighting system of the present invention utilizes a luminaire which has a spacing to mounting height capability of at least 1.5. Such luminaires exhibit a good photometric distribution for vertical foot candles such as a retail store rack or when other vertical space areas need to be illuminated. Thus, the luminaire utilized in the improved efficiency fluorescent lighting system of the present invention may be, for example, a Day-Brite TWRM fluorescent lighting product which has a spacing to mounting height ratio of 1.6.

The spacing to mounting height ratio (S/MH) is defined as the spacing between two luminaires such that the illumination on the floor midway between the two luminaires is equal to the illumination from one luminaire at nadir. This value is the ratio of the spacing to the mounting height of the luminaires. In the improved efficiency fluorescent lighting system of the present invention, as depicted in FIG. 1, the individual luminaire 12, lamp and ballast 14 combination may be spaced much further apart than the typical 12 foot spacing found in standard retail illumination applications. In most installations, they will be placed in end to end relationship forming rows of lights, FIG. 1 depicting an end view of the inventive system presently described. The predetermined horizontal spacing X, as shown in FIG. 1, for the presently described system may be about 18 feet with a predetermined vertical mounting height Y of between about 12 to 15 feet. However, the predetermined horizontal spacing X and predetermined vertical mounting height Y may be varied based upon the spacing to mounting height ratio evident in the luminaire utilized thus the specific spacing described herein is meant to be exemplary only in order to better describe the inventive aspect of the improved efficiency lighting system set forth. Thus, the optics for the luminaire must be sufficient to provide a relatively high S/MH ratio, as determined by the provided definition of S/MH dependant on illumination at point X/2, in order to allow for wide spacing of the individual fixtures.

Obviously, with increased spacing to mounting height ratio, a more efficient optical package and increased illumination from each individual luminaire is required. The system of the present invention utilizes a dimming ballast which may be used to dim the fluorescent lights in order to save energy when full lighting is not needed. These types of dimming ballasts may be used when skylights are implemented within the building structure to supplement electrical lighting. Dimming ballasts achieve a reduction in lumen output of the fixture by reducing the effective lamp current. Such dimming ballasts may necessarily require use of a rapid or programmed start ballast having a ballast factor of approximately 1.2. The ballast may use high frequency power as it is more efficacious in fluorescent lighting than 60 Hz power, thereby making it possible to run the lamps at a full rate of 32 watts and therefore obtain a ballast factor of approximately 1.2.

Ballast factor, as used herein, is defined by ANSI C82.2 1984, and is the relative light output of a lamp operated on the ballast with respect to the same lamp on a reference ballast. Typical electronic fluorescent ballasts exhibit a ballast factor of approximately 0.88. Utilizing a ballast having a higher ballast factor may at times cause damage to either the ballast or to the lamp by overdriving the lamp current thereby damaging the lamp and electrodes. However, with the system of the present invention and in particular the high efficiency lamps utilized, each lamp may be run at full 32 watts of power to produce the required lumen output.

The improved efficiency fluorescent lighting system of the present invention utilizes an electronic dimming ballast having a high ballast factor of 1.15 to 1.2 thereby producing a higher lumen output for the lamps. The lamps utilized in the system of the present invention are high efficiency lamps such as the Phillips Advantage lamp or the Osram Sylvania XPS lamp, both of which are four foot T8 lamps producing approximately 3,250 lumens. These lamps generally produce 3,040 lumens maintained and thus are a higher efficacy lamp as opposed to standard T8 fluorescent lamps. Utilization of the high efficiency lamps, dimming ballast and luminaire having a high spacing to mounting height ratio permits the system of the present invention to produce the same light as a standard fluorescent light system with only ⅔ of the fixtures required and 80% of the power usage.

As an example, in a typical retail lighting installation utilizing 6,000 lamps, the improved efficiency fluorescent lighting system of the present invention would only use 4,000 lamps and, due to the higher efficacy of the lamps and dimming ballast described herein, only about 82% of the electrical energy would be consumed. A standard known system having 6,000 lamps each utilizing 31 watts of power exhibits a total load of 186 kilowatts thereby producing 14 Mlumens. The improved efficiency fluorescent lighting system of the present invention would use 38 watts per lamp having a total load of 152 kilowatts producing 16 Mlumens. The system of the present invention thereby exhibits a savings of power usage of approximately 33 KW or 18%. The system of the present invention would exhibit a savings while the luminaires are fully powered and also while they are fully dimmed during daylight hours. Thus, in an exemplary store having 125 kilowatts of lighting, approximately 200,000 kilowatt hours per year may be saved. Such savings are exhibited by a 25 kilowatt reduction in load when the lights are fully powered and a 20 kilowatt reduction when the lights are fully dimmed assuming 10 hours of day of dimmed operation and 14 hours of day of full power operation.

Various additional modifications may be made to the illustrated implementations without departing from the spirit and scope of the invention. Therefore, the invention lies in the claims hereinafter appended.

We claim:

[1. An improved efficiency fluorescent lighting system having a plurality of luminaires located a first predetermined distance from a surface to be illuminated and spaced apart a second predetermined horizontal spacing distance, each of said luminaries in said system comprising:

a high efficiency fluorescent lamp retained within said luminaire, said luminaire having a spacing to mounting height ratio, said spacing to mounting height ratio defined by the ratio of the horizontal spacing distance to the vertical mounting height of two adjacent luminaires, of about 1.6;

a dimming ballast having a ballast factor of greater than 1.15.]

[2. The lighting system of claim 1 wherein said lamp in each of said luminaries is a T8 lamp four feet in length producing about 3250 initial lumens.]

[3. The lighting system of claim 1 wherein said first predetermined distance is twelve feet.]

[4. The lighting system of claim 3 wherein said second predetermined distance is about eighteen feet.]

[5. The lighting system of claim 1 wherein said ballast in each of said luminaires is a rapid start dimming ballast.]

[6. The lighting system of claim 5 wherein said ballast is an electronic ballast.]

[7. The lighting system of claim 1 wherein said system exhibits an efficacy in excess of 90 lumens per watt supplied to said system.]

[8. The lighting system of claim 2 wherein said lamp in each of said luminaires produces about 3040 lumens.]

[9. A plurality of improved efficiency luminaires for use in a fluorescent lighting system, comprising:

in each luminaire, a lamp electronically connected to a ballast, said lamp and ballast housed within said improved efficiency luminaire, said lamp being a high efficiency fluorescent lamp producing 3250 lumens, said ballast being an electronic dimming ballast having a ballast factor of between 1.16 and 1.2, said luminaires having a spacing to mounting height ratio of at least 1.5, said spacing to mounting height ratio defined by the ratio of the horizontal spacing to the vertical mounting height of two adjacent luminaires.]

[10. The luminaire of claim 9 wherein said fluorescent lighting system utilizes a plurality of said lamps, each of said lamps positioned in rows approximately eighteen feet apart, each of said lamps mounted at a mounting height of about twelve feet.]

[11. A method of implementation for a high efficiency fluorescent lighting system in combination with supplemental skylighting, comprising:

installing a plurality of fluorescent light fixtures in a plurality of rows, each of said rows separated by a predetermined separation distance;

mounting said plurality of fluorescent light fixtures above the ground a predetermined mounting height;

dimming said plurality of fluorescent light fixtures;

wherein each of said fixtures has a spacing to mounting height ratio of about 1.4 and a ballast factor of above 1.15, said spacing to mounting height ratio defined by the ratio of the horizontal spacing to the vertical mounting height of adjacent luminaries.]

[12. The method of claim 11 wherein said predetermined mounting height is above twelve feet.]

[13. The method of claim 12 wherein said predetermined separation distance is about 18 feet or more.]

[14. The method of claim 13 wherein each of said fixtures is fitted with a high efficiency fluorescent lamp producing at least 3200 lumens.]

[15. The method of claim 14 further comprising running said lamps for each of said plurality of fluorescent light fixtures at 32 watts or more.]

[16. A fluorescent lighting system having a plurality of fluorescent fixtures, comprising:

in each luminaire a lamp electronically connected to a ballast, said lamp and ballast housed within said fixture, said lamp being a fluorescent lamp producing about 3250 lumens, said ballast being an electronic ballast having a ballast factor of between 1.16 and 1.2;

wherein adjacent fluorescent fixtures of said lighting system have a spacing to mounting height ratio of at least 1.5, said spacing to mounting height ratio defined by the ratio of the horizontal spacing to the vertical mounting height of two adjacent luminaires.]

[17. A method of high efficiency fluorescent lighting, comprising:

installing a plurality of fluorescent light fixtures in a plurality of rows, each of said rows separated by at least 18 feet;

mounting said plurality of fluorescent light fixtures above the ground at greater than 12 feet, wherein adjacent fixtures have a spacing to mounting height ratio of at least 1.5, said spacing to mounting height ratio defined by the ratio of the horizontal spacing to the vertical mounting height of two adjacent luminaires;

running each of said fluorescent light fixtures at 32 watts and producing about 3250 lumens; wherein said fixtures have a ballast factor of about 1.2.]

*18. An improved efficiency fluorescent lighting system having a plurality of luminaires located a first predetermined distance from a surface to be illuminated and spaced apart a second predetermined horizontal spacing distance, each of said luminaires in said system comprising:*

*at least one high efficiency fluorescent lamp retained within said luminaire, said luminaire having a spacing to mounting height ratio of above 1.4; wherein said spacing to mounting height ratio is further defined as the spacing between two luminaires such that the illumination on the floor midway between the two luminaires is equal to the illumination from one luminaire at nadir; and,*

*an electronic ballast having a ballast factor of at least 1.15.*

*19. The lighting system of claim 18 wherein said at least one lamp in each of said luminaire is a lamp four feet in length producing greater than about 3040 lumens.*

*20. The lighting system of claim 18 wherein said first predetermined distance is greater than about 12 feet.*

*21. The lighting system of claim 19 wherein said second predetermined distance is about eighteen feet.*

*22. The lighting system of claim 18 wherein said ballast in each of said luminaires is a rapid start ballast.*

*23. The lighting system of claim 21 wherein said ballast is a dimming ballast.*

*24. The lighting system of claim 18 wherein said system exhibits an efficacy in excess of about 90 lumens per watt supplied to said system.*

*25. A plurality of improved efficiency luminaires for use in a fluorescent lighting system, comprising:*

*in each luminaire, a lamp electronically connected to a ballast, said lamp and ballast housed within said improved efficiency luminaire, said lamp being a high efficiency fluorescent lamp producing greater than about 3040 lumens, said ballast being an electronic ballast having a ballast factor of greater than about 1.15, said luminaires having a spacing to mounting height ratio of at least about 1.5;*

*wherein said spacing to mounting height ratio is further defined as spacing between two luminaires such that the illumination on the floor midway between the two luminaires is equal to the illumination from one luminaire at nadir.*

*26. The luminaire of claim 25 wherein said fluorescent lighting system utilizes a plurality of said lamps, each of said lamps mounted at a mounting height of about twelve feet.*

*27. A method of implementation for a high efficiency fluorescent lighting system comprising:*

*installing a plurality of fluorescent light fixtures in a plurality of rows, each of said rows separated by a predetermined separation distance;*

*mounting said plurality of fluorescent light fixtures above the ground a predetermined mounting height; and,*

*wherein each of said fixtures has a spacing to mounting height ratio of above about 1.4 and a ballast factor of above about 1.15, said spacing to mounting height ratio defined as a the spacing between two luminaires such that the illumination on the floor midway between the two luminaires is equal to the illumination from one luminaire at nadir.*

*28. The method of claim 27 wherein said predetermined mounting height is above about twelve feet.*

*29. The method of claim 27 wherein each of said fixtures is fitted with a high efficiency fluorescent lamp producing at least 3200 lumens.*

*30. The method of claim 28 further comprising running said ballasts for each of said plurality of fluorescent light fixtures at 32 input watts or more.*

*31. A fluorescent lighting system having a plurality of fluorescent fixtures comprising:*

*in each luminaire, a lamp electronically connected to a ballast, said lamp and ballast housed within said fixture, said lamp being a fluorescent lamp producing about 3250 lumens, said ballast being an electronic ballast having a ballast factor of above about 1.15; and,*

*wherein adjacent fluorescent fixtures of said lighting system having a spacing to mounting height ratio of above 1.4, said spacing to mounting height ratio defined as the spacing between two luminaires such that the illumination on the floor midway between the two luminaires is equal to the illumination from one luminaire at nadir.*

*32. A method of high efficiency fluorescent lighting, comprising:*

*installing a plurality of fluorescent light fixtures in a plurality of rows, each of said rows separated by between about 18 feet;*

*mounting said plurality of fluorescent light fixtures above the ground at greater than about 12 feet, wherein adjacent fixtures having a spacing to mounting height ratio of at least about 1.5, said spacing to mounting height ratio defined as the spacing between two luminaires such that the illumination on the floor midway between the two luminaires is equal to the illumination from one luminaire at nadir;*

*running each of said fluorescent light fixtures at about 32 watts or more and producing above about 3100 lumens; and,*

*wherein said fixtures have a ballast factor of above about 1.15.*

* * * * *